US011356429B2

(12) United States Patent
Fitzgerald et al.

(10) Patent No.: US 11,356,429 B2
(45) Date of Patent: Jun. 7, 2022

(54) SYSTEMS AND METHODS FOR DEVICE DATA TRANSFER

(71) Applicant: BLANCCO TECHNOLOGY GROUP IP OY, Joensuu (FI)

(72) Inventors: William Fitzgerald, Cork (IE); Dan Gustafsson, Cork (IE); Donal O'Shaughnessy, Cork (IE); Peter Bermingham, Cork (IE)

(73) Assignee: BLANCCO TECHNOLOGY GROUP IP OY, Joensuu (FI)

( * ) Notice: Subject to any disclaimer, the term of this patent is extended or adjusted under 35 U.S.C. 154(b) by 0 days.

(21) Appl. No.: 14/339,421

(22) Filed: Jul. 23, 2014

(65) Prior Publication Data

US 2015/0082410 A1    Mar. 19, 2015

Related U.S. Application Data

(60) Provisional application No. 61/857,526, filed on Jul. 23, 2013.

(51) Int. Cl.
*H04L 9/40*  (2022.01)
*G06F 16/178* (2019.01)

(52) U.S. Cl.
CPC ............ *H04L 63/08* (2013.01); *G06F 16/178* (2019.01); *H04L 63/0853* (2013.01)

(58) Field of Classification Search
CPC .............................. G06F 21/34; H04L 63/0853
USPC ........................................................... 726/9
See application file for complete search history.

(56) References Cited

U.S. PATENT DOCUMENTS

| | | | |
|---|---|---|---|
| 8,838,094 | B2 | 9/2014 | Thing |
| 2007/0143832 | A1* | 6/2007 | Perrella ............... H04L 63/0823 726/5 |
| 2007/0145138 | A1 | 6/2007 | Snyder et al. |
| 2008/0057990 | A1 | 3/2008 | Fuccello et al. |
| 2008/0295160 | A1 | 11/2008 | Cuprin et al. |
| 2012/0066493 | A1* | 3/2012 | Widergren .......... H04L 63/0428 713/160 |
| 2012/0185434 | A1 | 7/2012 | Giampaolo et al. |
| 2014/0068744 | A1* | 3/2014 | Bran ...................... G06F 21/00 726/9 |
| 2014/0273820 | A1* | 9/2014 | Narayan ............. H04W 76/023 455/41.1 |

FOREIGN PATENT DOCUMENTS

WO    2006023836 A2    3/2006

OTHER PUBLICATIONS

"Que Computer Dictionary definition of MAC" as follows: "Mitchell Shnier, Computer Dictionary 390 (1998)".*

(Continued)

*Primary Examiner* — Anthony D Brown
(74) *Attorney, Agent, or Firm* — Dickinson Wright PLLC (57) ABSTRACT

There is provided a method and system for securely coupling and transferring data between devices. In a preferred embodiment, the devices may comprise two devices, a transferring device and a receiving device, and both devices are mobile devices. Embodiments of the present invention allow the wireless transfer of data such as contacts, photo images, video files, or other data from one device to another device, without need for special hardware or cabling.

21 Claims, 5 Drawing Sheets

(56) References Cited

OTHER PUBLICATIONS

Nitesh Saxena, "Secure Device Pairing based on a Visual Channel," Internet Citatian, May 31, 2006, http://eprint.iacr.org/2006/050.pdf.
Darko Kirovski et al., "The Martini Synch: Device Pairing via Joint Quantization," Information Theory, Jun. 24, 2007.
International Search Report, issued by the International Searching Authority dated Jan. 29, 2015 for related PCT Application No. PCT/IB2014/002068.
Jason Ankeny, AT&T Extends Free Data Transfer App to Microsoft's Windows Phone, Apr. 9, 2012, www.fiercemobileit.com/story/att-extends-free-data-transfer-app-microsofts-windows-phone/2012-04-09.
Ye-Sheng Kuo et al., "Hijacking Power and Bandwidth from the Mobile Phone's Audio Interface," Electrical Engineering and Computer Science Department, University of Michigan, (undated).
European Office Action issued by the European Patent Office dated Jul. 25, 2017 on related European patent application 14799532.8.

* cited by examiner

SYSTEMS AND METHODS FOR DEVICE DATA TRANSFER

CROSS REFERENCE TO RELATED APPLICATIONS

This application claims priority to U.S. Provisional Patent Application No. 61/857,526 filed Jul. 23, 2013 titled, "SYSTEM AND METHOD FOR DEVICE DATA TRANSFER," the disclosure of which is fully incorporated herein by reference for all purposes.

NOTICE OF INCLUDED COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. All trademarks and service marks identified herein are owned by the applicant.

DESCRIPTION OF THE INVENTION

Field of the Invention

The present invention relates to systems and methods for transferring data between two electronic devices, which may be similar or different devices such as cellular mobile telephones and may include copying data from source device(s) to target device(s) without deletion from the source, or moving/transferring with deletion of the original from the source device(s).

BACKGROUND OF THE INVENTION

Digital data migration has been one of the classic problems that arise from advances in technology. As consumers of electronic devices and systems are increasingly attracted to devices that offer more advanced user features, have higher-powered or better-provisioned hardware, offer higher resolution or more attractive view screens, the motivation to acquire new devices results in periodic replacement of dated equipment. Additionally, unintentional device abuse often results in failures such as a cracked or broken display; such failures drive additional purchases of new or upgraded hardware. However, one problem every consumer of new electronic devices must confront is how to migrate data that resides on a previously owned device to the newly purchased device or system. There are several elements that complicate the process; namely, dissimilar hardware interfaces or lack of compatibility between operating systems impedes electronic connection between devices. Consider, for example, two currently-popular mobile devices; an Apple iPhone and a Samsung Galaxy S5 mobile phone. Neither device shares common data port architecture, a common operating system, or a memory card slot, so just directly connecting two devices and moving data is not generally possible without intervention from special hardware, software, or both.

Data transfer utilities that employ wired techniques have been in use for quite some time. For example, LapLink software has been using a wired approach to move data between personal computers for more than twenty five years. However, mismatched operating systems and incompatible hardware render this approach problematic. For that reason, certain companies have provided hardware and software "kits" that have a variety of cables and an intermediary hardware device that provides a dedicated connection to migrate selective data. Mobile carriers often use these kits to assist users with data transfers between old devices and new devices. However, such kits are expensive, require significant training, must be updated periodically with new hardware, cabling and software, and create bottlenecks in businesses that have high volumes of new unit sales.

What is needed is a means to transfer data (preferably wirelessly) and securely between devices. What is also needed is a means to allow users to transfer data between devices by downloading, installing, and running software on devices that enables the user to move, copy, or back up data without having to take devices to a provisioning center or service center to have third-party assistance to move the data between the devices.

SUMMARY OF THE INVENTION

There is disclosed a method and system for securely coupling and transferring data between devices. In a preferred embodiment, the devices may comprise two devices, a transferring device and a receiving device, and both devices are mobile devices. Embodiments of the present invention allow the wireless transfer of data such as contacts, photo images, video files, or other data from one device to another device, without need for special hardware or cabling. As used herein, the term "device(s)" means one or more devices. In an alternative embodiment, a plurality such as three or more devices may be coupled and data transferred selectively between such coupled devices. As used herein, the term "mobile device," "mobile electronic device," or "device" generally refers to any electronic device capable of storing, transmitting, and/or receiving data. A mobile device may be a stand-alone device such as a laptop computer, a desktop computer, a mobile subscriber communication device, a mobile phone, a mobile smart phone, a mobile feature phone, a personal digital assistant (PDA), a data tablet, a digital camera, a video camera, a video game console, a media player, a Google Glass device, a global positioning system (GPS), Universal Serial Bus (USB) keys, mobile weapons, mobile storage devices, vehicles, vehicles including a communication device, and combinations thereof. However, embodiments of the present invention may also allow non-mobile devices to be electronically coupled to other devices such as mobile devices, depending on whether data needs to be interchanged. Devices of the present invention may execute any operating system such as iOS, Android, Windows, Windows Mobile, Apple operating systems, Linux, Symbian, Unix, Blackberry OS, WebOS, or any conventional operating system, and devices paired in embodiments of the present invention do not need to be executing the same operating system, and may be executing operating systems that are normally directly incompatible. For example, a transmitting or source device may be executing the iOS operating system, and a receiving or target device is executing the Android operating system. A mobile electronic device may also be any electronic device integrated with another system or device. For example, a stereo, a global positioning system, an information-enabled appliance, a home automation appliance, or any other electronic system may include a mobile device within a larger system. Automobiles and systems within automobiles also fall within the scope of "devices" as mentioned in the instant application, and may include automobile information systems, automobile diagnostic or operating systems, navigation systems, or other electronic devices contained within an automobile or other vehicle. In one embodiment, software may be installed on two devices that are intended to be used in a data transfer scenario, such as when an owner of the first or transmitting (or "source," or "old") device has purchased a second device, which includes a receiving (or "target," or "new") device, and wishes to transfer data from the first ("transmitting") device to the second ("receiving") device. For purposes of the present application, the terms "transmitting," "source," or "old" device may interchangeably refer to a device from which data is being copied, and the "receiving," "target," or "new" device interchangeably refers to a device that is intended to receive the copied data. Such data can comprise any type of data in any format, and may include, for example but not by way of limitation, contacts, image files, SMS messages, video and audio files, ringtones, data files, text files, configuration files, executable files, and applications (or "apps"). In one embodiment, the first or receiving device is a mobile telephone with contacts, images, and videos, and those contacts images and videos are desired to be transferred to the second or receiving device, which may also be a mobile telephone. Those of skill in the art appreciate that more than two devices may be utilized in any scenario, and any type of accessible data may be transferred from the first device to the second device, and data flows may be in any desired direction.

Those of skill in the art recognize that aspects of the present invention may be scaled so that a one-to-many device data transfer scenario may be created, where data from one device is copied to a plurality of devices, in total, or part of data from the transmitting device distributed across one or more of the plurality of receiving devices. Additionally many to one or many-to-many transfer scenarios fall within the ambit of the present invention, and allows any type of flexible data transfer, backup, storage, incremental backup, offline storage, remote server, cloud storage, or synchronization with arbitrated write/overwrite/non-write capability. Those of skill in the art appreciate that the data flow may be unidirectional from the transmitting device to the receiving device or from the receiving device to the transmitting device, or bidirectional in character. In various embodiments, source devices may also transfer data to cloud storage or server storage as desired for immediate or later transfer to one or more target/receiver devices.

Embodiments of the present invention form a network of the devices intended to interchange data, in a direct client/server configuration supporting direct data exchange. One device is typically designated as a server, and at least one other device is configured as a client. In this configuration, no separate third server or database is required to act as a temporary storage medium, where one device would send data to the third server or database, where after the data could be downloaded from the third server/database by the target device. By using device recognition techniques such as scanned QR codes (abbreviated from "Quick Response" code, machine-readable codes consisting of an array of black and white squares, typically used for storing URLs or other information for reading by the camera on a smartphone) or visual confirmation of a visual token, networked pairings of devices may be confirmed so that security is ensured and undesired pairings are prevented.

In a preferred embodiment, there is presented a method for interchanging data between a plurality of provided devices with data transfer software installed on the devices, the method comprising: configuring the data transfer software on two devices from the plurality of devices to identify each of the two devices to be either a respective source device or a target device, wherein one or more data items from the source device are intended to be transmitted to the target device; designating one of the source device and the target device to become a network server, wherein: the designated device is configured to operate as a network server to the non-designated device; and the non-designated device is configured to operate as a network client to the designated device; generating a pairing authenticator comprising routing information; and communicating the pairing authenticator whereby the routing information allows unique association between the client device and the server device through the network.

Once the network between devices is established, data transfer may occur by identifying data items on the source device for transfer to the target device, whereby a group transfer list is compiled that comprises identifying information for one or more of the identified data items; and for each identified data item in the group transfer list: transmit metadata about the identified data item from the source device to the target device; determine, based on analysis of the metadata by the target device, whether to perform transfer of the identified data item, wherein if the determination concludes that the data item is not to be transferred, processing continues with no transfer of the identified data item and proceeding to a next identified data item in the group transfer list; transmit the identified data item to the target device; and continue to the next identified data item in the group transfer list, if any remain un-transmitted. The pairing authenticator may be generated by the client or the server, and may comprise a QR code. The QR code may be communicated from one device to another by any desired means, such as being displayed on one device and sensed by scanning through the camera, drivers, and software of the other device.

It may be desirable to have confirmation that a plurality of devices have been successfully paired, either for security purposes or to facilitate unique connections in an environment where multiple devices are present and data is being transferred (such as in a mobile phone sales or service department). Therefore embodiments provide for: generating a visual indicia by the server; transmitting the visual indicia to the client; and displaying the visual indicia on the server and the client to allow visual confirmation of a network configuration between the server and the client. The visual indicia may comprise any desired subject matter, such as one or more of a stored visual image, a color scheme, a word, a number, or a photograph taken by the server. The user may be prompted by one of the devices such as the server to view and confirm display of the visual indicia matches on devices that are desired to transfer data, and thus appreciate that the device pairings were successfully created before any data transfer takes place.

Alternative confirmation approaches are also provided, for instance, generating a server authentication token comprising a time of tap by sensing data from an accelerometer in the server device indicating an impulse tap force was applied to the server device, and associating the time the tap occurred to the server device with a time of day; generating a client authentication token comprising a time of tap by sensing data from an accelerometer in the client device indicating an impulse tap force was applied to the client device, and associating the time the tap occurred to the client device with a time of day; and comparing the server authentication token with the client authentication token to determine whether both tokens indicate taps occurred to the client device and the server device within a predetermined timing window. The time window may comprise any desired value such as 500 milliseconds, and may be user configurable to allow tighter tolerances for reduced pairing errors, or looser (longer) values to allow taps to occur less closely in time and indicate a desired pairing.

When transferring data from the source device to the target, a user may be asked to select what data needs to be transferred. Accordingly in an embodiment, identifying data items on the source device for transfer to the target device further includes scanning data items on the source device, and displaying the scanned data items on the source device for selection by a user. As part of data transfer, data items may be normalized or reformatted to work in different or incompatible environments. And to further streamline transfer rates and reduce duplicate data during the transfer process, a hashing approach allows quick comparisons to determine whether a source file and a file on the target device are identical. One embodiment comprises generating, by the source device, respective source hash values for at least one of the identified data items; generating, by the target device, respective target hash values for data items residing on the target device; transmitting the source hash values to the target device; and comparing the source hash values with the target hash values. To assist with setting up data transfer, one approach comprises creating group transfer metadata for a group of data items corresponding to the group transfer list, and potentially, sending, by the source device the group transfer metadata to target device.

One common situation where data transfer is desired is migration of data from a damaged/dysfunctional device to a new device. However, hardware on the damaged device may not directly be able to perform data transfer steps without assistance without further intervention from an intermediary device. Therefore embodiments include methods wherein one of the two devices includes an intermediary device coupled to a third device; the third device includes data items to be transferred to the target device; and the intermediary device communicates with the target device, emulating the third device as a source device to provide data items to be transferred from the third device to the target device through the network established between the target device and the intermediary device.

Embodiments of the present invention also include transfer of data between vehicles such as automobiles. Therefore there is provided a method for interchanging data between a plurality of provided vehicles equipped with communication devices with data transfer software installed within the provided vehicles, the method comprising: configuring the data transfer software on two vehicles from the plurality of vehicles to identify each of the two vehicles to be either a respective source device or a target device, wherein one or more data items from the source device are intended to be transmitted to the target device; designating one of the source device and the target device to become a network server, wherein: the designated device is configured to operate as a network server to the non-designated device; and the non-designated device is configured to operate as a network client to the designated device; displaying, by one of the vehicles, a pairing authenticator comprising routing information; and communicating the pairing authenticator whereby the routing information allows unique association between the client device and the server device through the network. The data to be transferred between vehicles may be further provided by identifying data items on the source device for transfer to the target device, whereby a group transfer list is compiled that comprises identifying information for one or more of the identified data items; and for each identified data item in the group transfer list: transmit metadata about the identified data item from the source device to the target device; determine, based on analysis of the metadata by the target device, whether to perform transfer of the identified data item, wherein: if the determination concludes that the data item is not to be transferred, processing continues with no transfer of the identified data item and proceeding to a next identified data item in the group transfer list; transmit the identified data item to the target device; and continue to the next identified data item in the group transfer list, if any remain un-transmitted. Embodiments provide that communicating the pairing authenticator further comprises: displaying a QR code on a first vehicle of two of the vehicles; and scanning the QR code by a camera included within a second vehicle of the two vehicles. Any kind of data may be transferred between vehicles, and some examples comprise acceleration data, steering data, braking data, navigation data, audiovisual data, and navigation data.

BRIEF DESCRIPTION OF THE DRAWINGS

A more complete understanding of the present invention may be derived by referring to the detailed description and claims when considered in connection with the following illustrative figures.

DETAILED DESCRIPTION OF EXEMPLARY EMBODIMENTS

Figure 1:
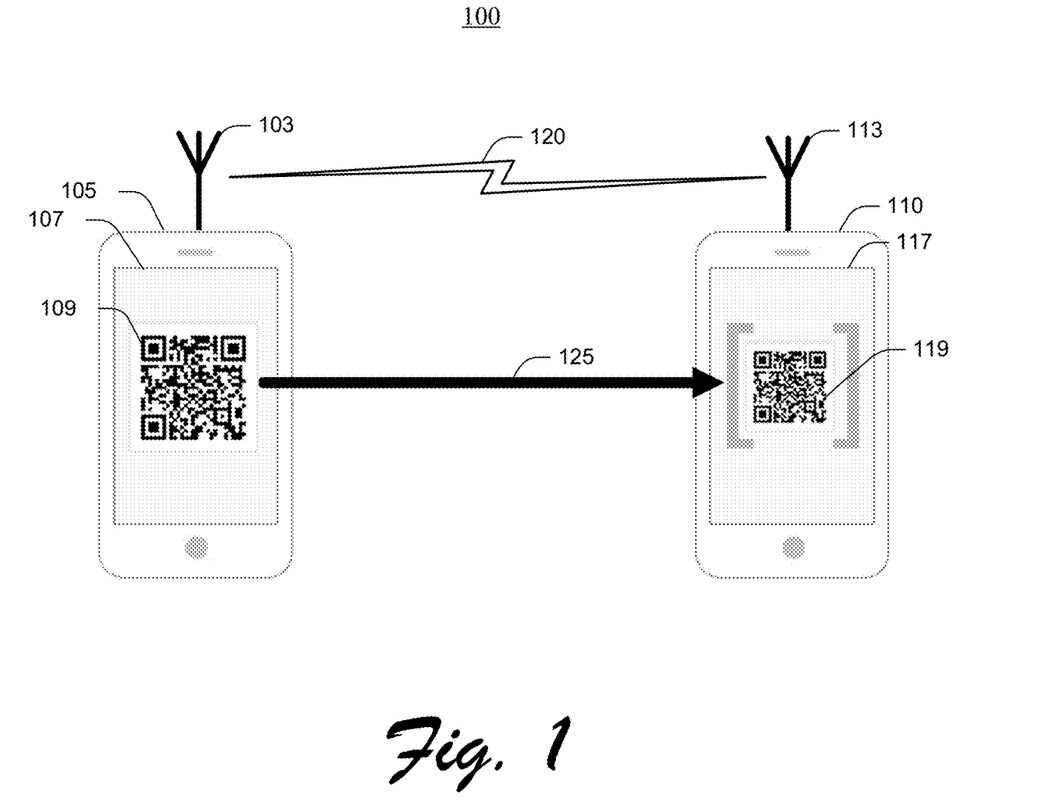
FIG. 1 is a diagram depicting an exemplary system of the present invention.

Embodiments of the present invention include a plurality of devices, and in one exemplary embodiment, two devices shown in FIG. 1. A device 105 comprises, in one embodiment, a smartphone with data that is desired to be transferred to another device 110. Each device comprises an antenna 103 which is typically internal, and provides a wireless connection 120 enabling a network to be set up between the devices 105 and 110. In the exemplary embodiment, each device (105, 110) has a display (107, 117) upon which various information can be displayed, such as a visual representation of a QR code (109, 119). Device 110 is configured with a scanning capability, (for instance a camera, drivers, and software, not shown) to optically scan 125 the QR code 109 from device 105 and after extracting data from the QR code, display the QR code 119 as a confirmation that a network connection will be securely set up between the devices (105, 110). Additional steps will be outlined below regarding data transfer methods.

Figure 2:
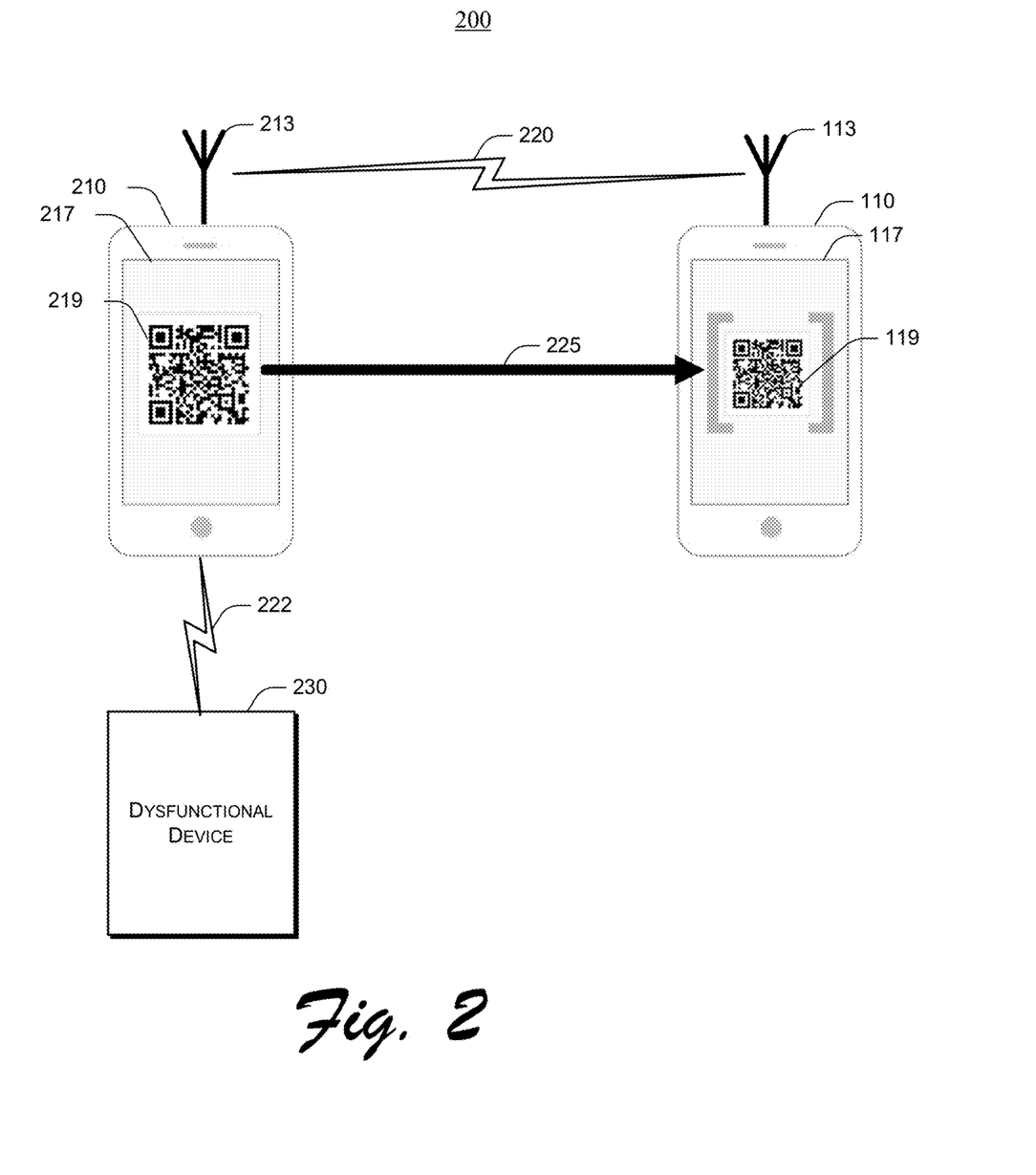
FIG. 2 is a depiction of an alternate exemplary system of the present invention showing intermediary device connection.

In some instances, older devices may become damaged and become unable to fully perform all steps necessary to transfer data without further assistance. FIG. 2 illustrates an embodiment of the present invention provides data transfer for partially operable devices. An intermediary device 210 is coupled 222 by wired or wireless means to the malfunctioning device 230. Through software installed on the intermediary, the device 210 acts as a conduit for data stored on the dysfunctional device 230, enabling the target device 110 to receive data from the dysfunctional device 230 through the intermediary device 210 via network connection 220. Similarly to the embodiment illustrated in FIG. 1, each device (210, 110) has a display (217, 117) upon which various information can be displayed, such as a visual representation of a QR code (219, 119). Device 110 is configured with a scanning capability, (for instance a camera, drivers, and software, not shown) to optically scan 225 the QR code 219 from intermediary device 210 and after extracting data from the QR code, display the QR code 119 as a confirmation that it will set up a network connection between the devices (220, 110).

Figure 3A:
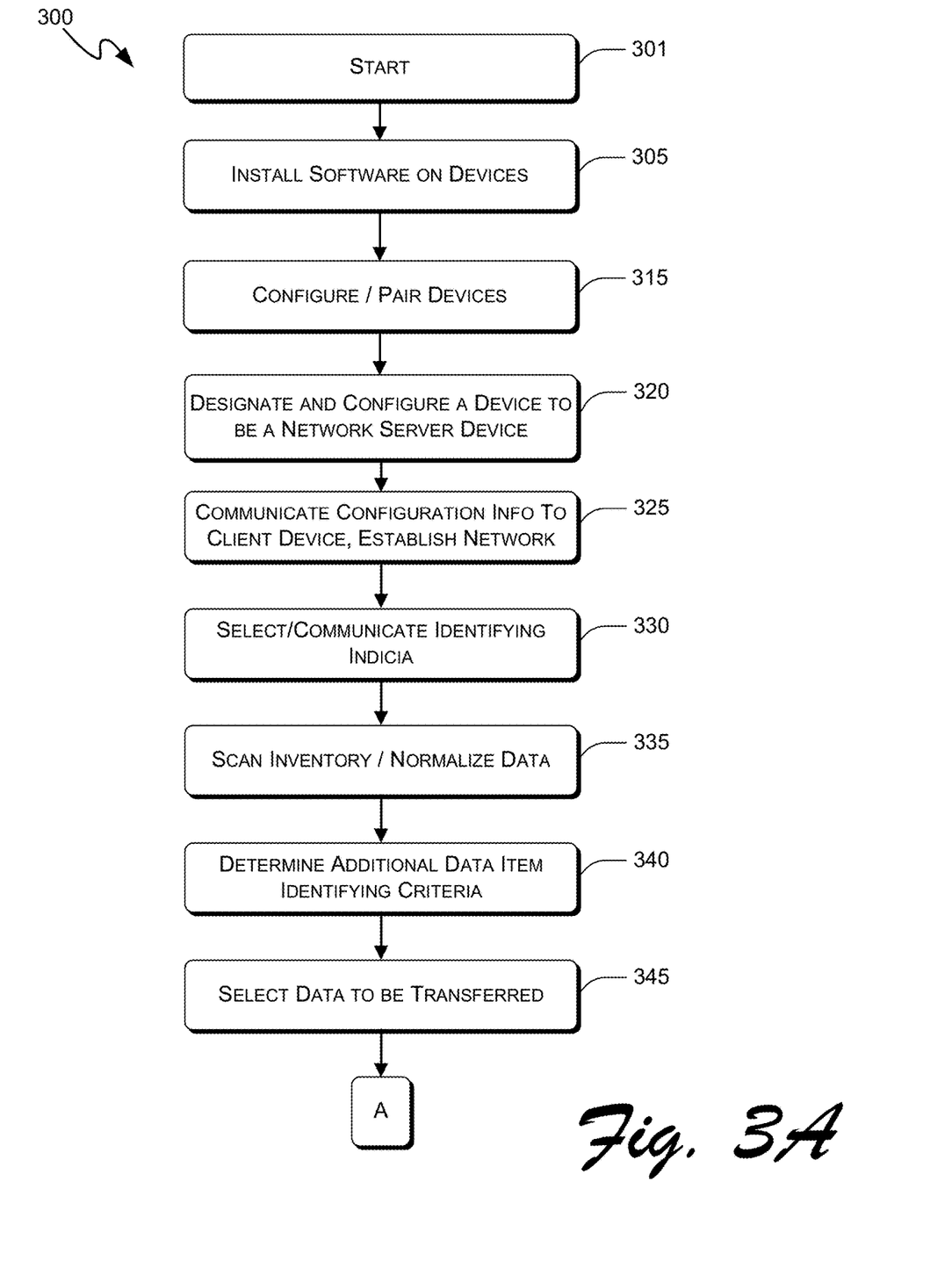
FIG. 3A is a partial flow chart illustrating a method of the present invention, and is continued to FIG. 3B.
Figure 3B:
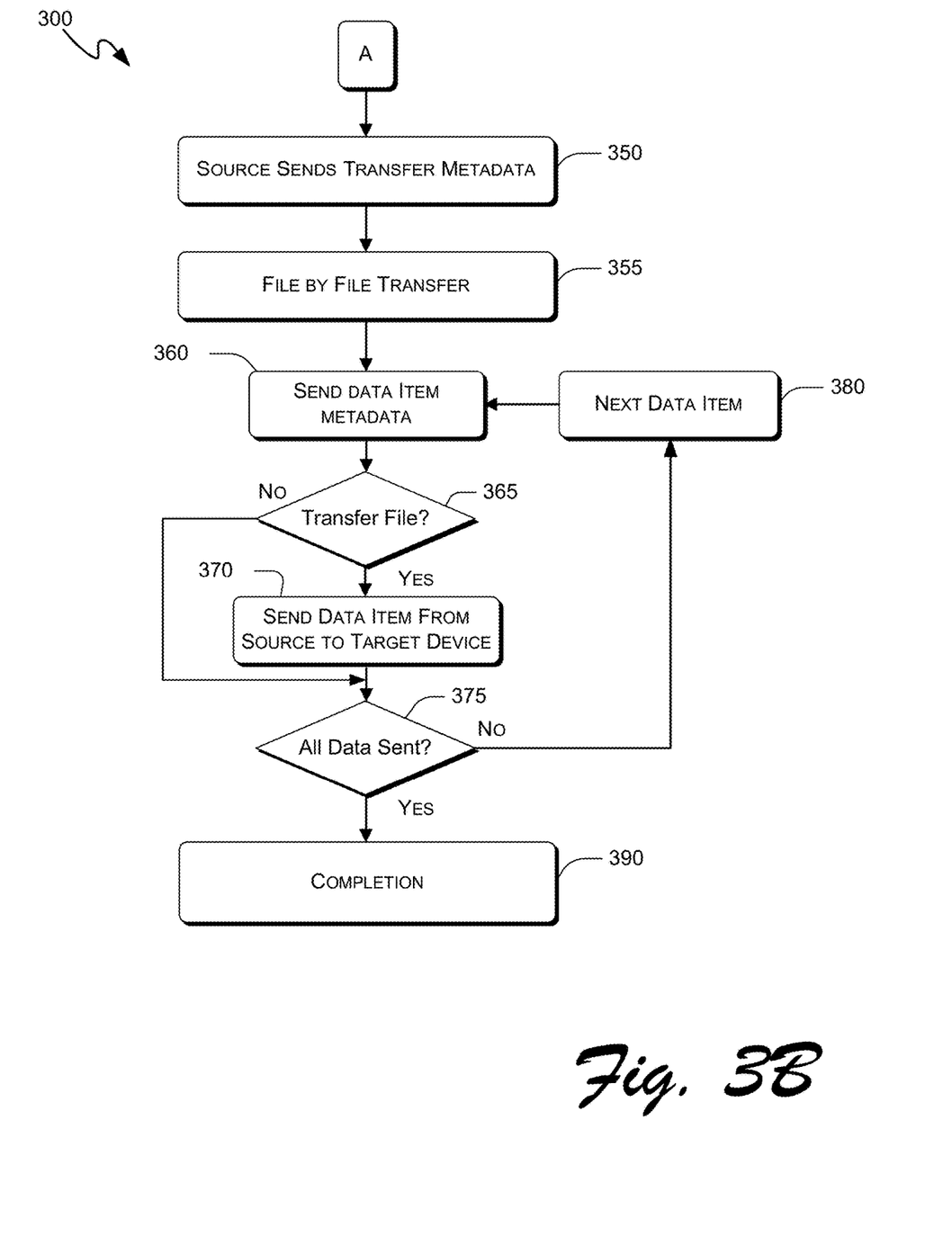
FIG. 3B is a continued flow chart illustrating a method of the present invention.
Figure 4:
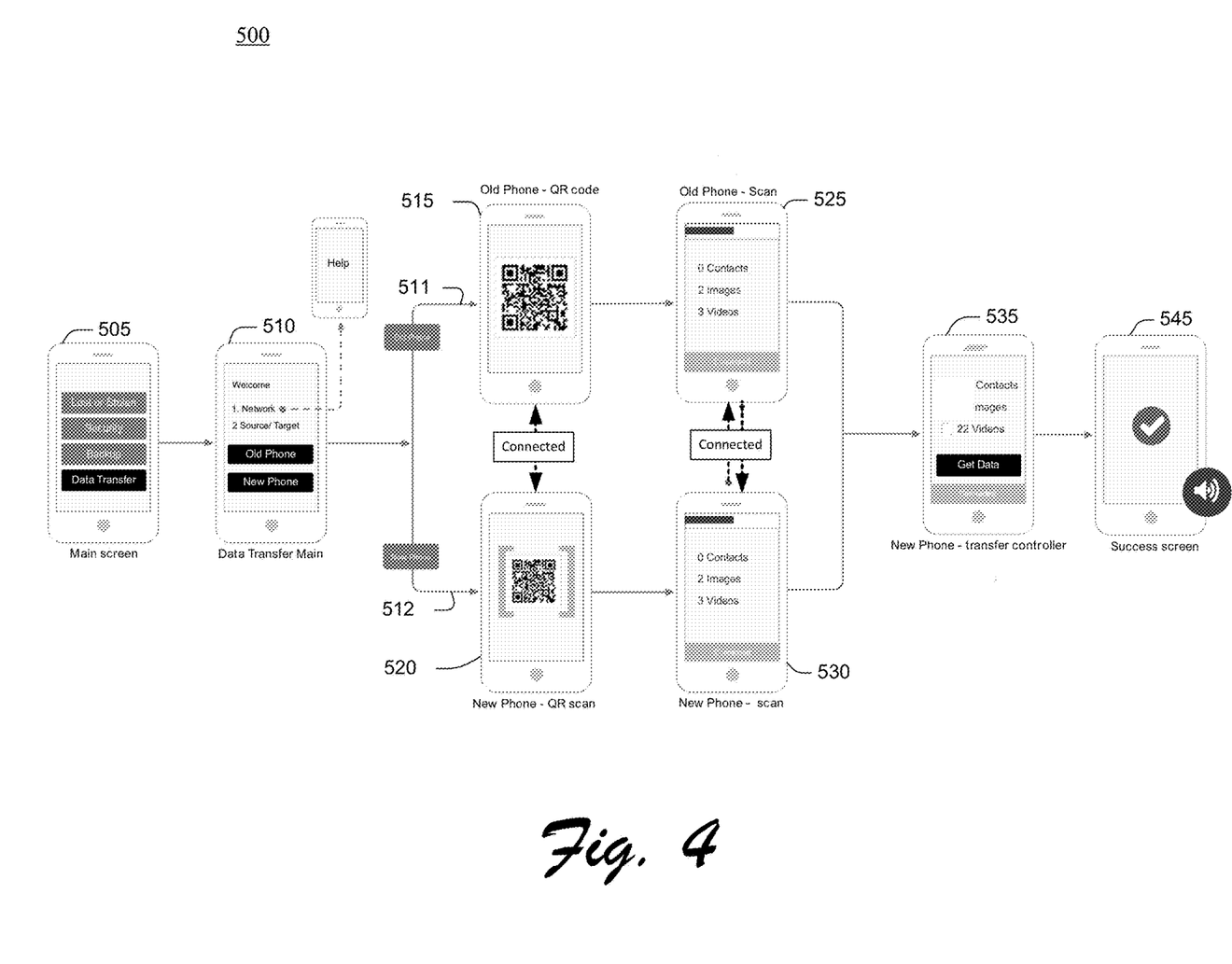
FIG. 4 is a block/flow diagram illustrating a summarized data transfer approach.

In one embodiment, a method of the present invention includes the following steps, illustrated by flow chart 300 in FIGS. 3A-3B, and further summarized in FIG. 4 which may be executed in any logical order, and with or without steps as each step may be optional:

1. Install Software.

(FIG. 3A, 305) Software is installed as an application on the devices between which data will be transferred. Software to implement methods of the present invention can be (1) installed on, or (2) downloaded onto a device indirectly or directly at any time by an authorized user through the Internet, through a mobile network operator, through a mobile telephony system, through SMS text message, through a fixed or removable storage medium, or in any other suitable manner and at any suitable time for carrying out a method according to the invention. Installed software is then executed (as exemplified in one embodiment in FIG. 5) to perform steps of the present invention.

2. Select and Configure Device Types.

Each device is identified as applicable, as a transmitting/source device and a receiving/target device (FIG. 3A, 315). This can be done, for example, through a button system (FIG. 4, 510) where the user makes the selection to designate which type of device the instant device should be configured to operate as. Other methods may include electronically scanning the data on each of the devices and making a determination based on the content on each device or how far any measurable date stamps date back. In certain embodiments, more than two devices may be configured to share data, such as a single source device providing data to a plurality of devices, or a plurality of devices synchronizing data between each other so that certain data identified on the devices then commonly exists on each of the plurality of devices.

3. Designate Device to Become a Server, and Configure Such Device as a Server (FIG. 3A, 320).

One of the devices utilized in the transfer is designated to be a server in a network configuration between the source and target devices, and the other device(s) is/are designated as client(s). Either the source device or a target device may be designated, and optionally, both could be designated if the situation requires. One type of server configuration is embodied in a conventional secure socket server through SSL. An SSL Server requires a certificate. In one embodiment, a self-signed certificate is generated by the Software for each connection. The server can be set up on any network where the devices can communicate, and can be done in any conventional manner as those of skill in the relevant arts appreciate. The implemented network may be wired or wireless, managed or unmanaged. The server is set up by the Software on a randomly selected port on the device (the designated source device or target device) and selected to be the server. The server or the client can act as a source or target for the purpose of the transfer. In a preferred embodiment, the server may be designated on the source device, and the client device(s) are the target device(s).

4. Communicate Configuration Information Over the Client Device(s) for the Device(s) to Connect Over the Established Network (FIG. 3A, 325).

One embodiment includes encoding the routing information in a generated network authenticator such as a QR code on the server device and communicating the network authenticator or displaying the QR code on a display of the server device. The displayed QR code (FIG. 4, 515) can be scanned with a QR code reader on a client device (FIG. 4, 520), such as through the camera of the client device with appropriate servicing and driver software. In a preferred embodiment, the source device (FIG. 4, 515) displays the QR code that is in turn scanned by a camera and software in the target device (FIG. 4, 520) to receive the network routing information. The QR code reader may implemented within or instantiated by the application. There are several other methods for communicating the configuration information that may be utilized within embodiments of the present invention, which may include checking in with a server to associate the devices or allow them to share connection information over Bluetooth or using short codes to map to network addresses. In alternate embodiments, using NFC, tap-to-transfer, measurements of accelerometers for tapped devices correlated with time of measured tap impulse, manual digital codes, or other techniques may be utilized to associate "pair" the devices with one another. In such a tap-impulse embodiment, the software installed on each device is in communication with one or more accelerometers within the respective devices, and a respective time-measurement process/device within the respective device. When devices are to be paired, upon prompting by the software through a display on the device, the devices are tapped, such as on a table top, within short temporal proximity of one another (or, tapped at about the same time). The software measures the time the impulse tap occurs, and creates an authentication token with the time of tap plus a user-selectable and predetermined time window. The predetermined time window may be any desired value, such as 500 milliseconds. When the devices attempt to authenticate to the network, the client device's authentication token is compared to the server's authentication token, and if a determination is made that both tokens indicate that the measured times of the impulse tap occurred within the timing window, then network setup is allows to successfully continue, otherwise connection is refused and the user is prompted to either terminate the process or, if desired, tap the phones again in approximate temporal proximity. As used herein, "pair" indicates a logical association of two or more devices and is not limited to groups of two devices or an even number of devices.

5. Select Identifying Indicia (FIG. 3A 330).

In a preferred embodiment of the present invention, one of the devices involved in the data transfer makes a random selection of color and image and random number to be displayed on displays of both the source and target devices; these become identifying indicia for the pairing. This selection of identifying information is passed over to the other device and both devices show the same information on their screens, allowing a human user to visually verify which devices are to be used in a paired data transfer. For example, the identifying indicia may be a red banner with an image of a flower and a matching number. In another option it may be a blue banner with an image of a car and another random number. The identifying indicia, in addition to other functions, allows a paired configuration of devices to be easily visibly identifiable and traceable, so that if multiple devices are being separately paired, separate source and target devices will not be intermingled undesirably, such as when a store or service center is conducting multiple concurrent but independent data transfers between separately paired devices, and it is desired not to mix up the owners of the devices between pairs that may be in physical proximity. Any other information could be displayed as desired; including an approximate time when respective multiple devices were tapped and respectively detected an impulse in their respective accelerometers. In one embodiment the image displayed on both the source and target devices includes a photographic image of the owner of those devices, and the image could be captured by one of the devices as part of the setup process of this method. In any event, a visual confirmation token is displayed on a screen of the devices, and a user confirms the match by visually matching the tokens before continuing the data transfer process. In one embodiment, the user is prompted by the server-designated device to accept or decline continued data transfer based on visual confirmation or non-confirmation that the visual tokens match. In one embodiment, a physical tap is used to assist with the confirmation or pairings of devices in the network. Taps are respectively sensed by respective accelerometers and associated by the software with a time of day the respective taps were sensed within the respective devices. These tap times are then displayed on the respective screens of the mobile devices. A user may visually confirm similarity of the tap times and indicate acceptance through a prompted input to the server device, or and cameras within the devices optically capture the time or time token of the measured time of tap, and determine whether it is sufficiently temporally proximal to its own respectively measured tap (that is, the time that the other device sensed a tap was within a time window of when the optically scanning device had detected its own tap. If the sensed tap time of another device as optically determined by the camera of a device is within its own tap timing window, pairing and authentication may be allowed to automatically proceed.

6. Scan Inventory (FIG. 3A, 335).

All devices (FIG. 4, 525, 530) scan their respective data inventories to build up a list of items they have in their respective data stores that are capable of being transferred to another device.

7. Normalize Data (FIG. 3A, 335).

Data stored on any of the devices, but in one embodiment on the source device, may be adjusted or modified in any desired manner. For example, contacts may be normalized so that a contact extracted from any device or operating system can be identified by hash or signature even though the representation may be different across devices or operating systems. In a similar embodiment, data normalization may entail translating the data to a standard data format.

8. Determine Additional Identifying Criteria for Data Items (FIG. 3A, 340).

A small sample of each image and video on the devices, and in one embodiment just the source device, is scanned and hashed into respective signatures. Any desired hash technique may be employed such as a Whirlpool hash, an SHA hash, a RIPEMD hash, an MD5 or MD6 hash, and in a preferred embodiment, the MD5 hash technique is used. By creating the collection of hash signatures, this technique assists in speeding up the transfer process but also to be able to identify a duplicate over different devices or operating systems where some operating systems may process images that are stored so making a signature of the entire piece of data would not identify a duplicate. For example, comparing the hash values of a file from the source device with a hash value for a file on the target device is far more bandwidth- and computationally-efficient than comparing files on a bit-by-bit basis, which would require sending the entire source file in question to the destination device before comparison could occur. In one embodiment, the location of the sample taken from each of such image or video on the devices may be standardized to the beginning of a file, the end of a file, a certain byte-offset within a file, or may be selected and tailored according to the operating system of the respective device. In one embodiment, the hash algorithms may be varied or configured according to the devices being used in the transfer, and in an embodiment, sampling size and position of the file to be transferred may vary since the act of storing certain file types (for example, photos or videos) on different devices or operating systems and/or at different times on the same operating systems or device can alter the hash result. In this case, the software can compensate by identifying a preferred algorithm and data sample location to make the hash result consistently identify the file that is being sampled.

9. Select Data to be Transferred (FIG. 3A, 345, FIG. 4, 535).

Optionally, users may be provided an interface on the source device(s) to select what information is to be copied/transferred to the target device(s). This may be performed by a browser interface and file selection, by presenting categories of data to be transferred (in one embodiment, "Contacts," "Videos," and "Images" may be independently selected).

10. Source Device Sends Group Transfer Metadata (FIG. 3B, 350).

The source device communicates to the target device certain metadata about all the data to be transferred, such as how many items the target/receiving device should expect from the transfer.

11. File by File Transfer (FIG. 4, 535).

For each file to be transferred, the following process is undertaken:

a. Once the connection is established the sending device will send over metadata about a file to be sent. This may include size, hash, file name and file type (FIG. 3B, 360).

b. The receiving device will assess if the item should be transferred (FIG. 3B, 365). This is done by checking if it already has an item with the same hash and if the device can support the item being transferred. The receiving device replies with YES/NO or other indicia depending on whether the item should be transferred or not.

c. If the item is not going to be transferred the sending device continues to the next item (FIG. 3B, 380).

d. If the receiving device decides to receive the data item, the sending device transmits the data item (FIG. 3B, 370) to the receiving device to store. In one embodiment, the connection utilizes TCP over the network formed between the client and server devices to ensure that the data received is correct. In alternate embodiments files may be optionally verified to ensure the source and target versions of the data item are identical, and if not, the data item from the source is retransmitted until correction is complete. In one embodiment, a digital signature of the item received can be added to a database to further prevent duplicates being transferred from the source to the target devices.

e. When an item has been transferred to the target device and stored in the appropriate location for the target device or operating system, the source/sending device sends over the next piece of metadata (FIG. 3B, 380, 360). Storing the item may also happen concurrently to receiving another item.

f. The execution of steps 11a-e continues until all desired data is transferred from the source to the target device (s) (FIG. 3B, 375).

12. Completion (FIG. 3B, 390).

On completion the user may have the option to view statistics from the transfer. There may also be audio and/or visual alerts at completion and along the way. For example such alerts may include parameters such as percentage complete (with progress bars); scanning complete, transfer complete, Device with pin number 4667 (or any other indicia) is ready to collect.

Interruption of Copy/Transfer.

Embodiments of the present invention handle the interruption of connectivity between devices during the copy/transfer process by detecting partially transferred files, re-starting transfer of the partially transferred file, and resuming transfer of the designated files that had yet to be transferred from the source device. Optionally file transfer/copy may be resumed by starting with the last data sent and continuing, or optionally beginning the entire transfer/copy process from the beginning.

An embodiment of the present invention addresses the situation where a device has undergone a partial malfunction that prevents it from normally operating in a manner that would allow data transfer as set forth above. In this case, it is desirable to be able to transfer data from the device to another device, such as when a user wishes to begin utilizing a replacement for the dysfunctional device. Since mobile devices are often subjected to rough handling by users, incidences such as cracked/broken display screens, water immersion, or other hardware failures may interfere with visual confirmation of establishing a pairing, transferring data, among other functions. In this embodiment, the dysfunctional mobile device is physically connected to an intermediary device that is able to access the dysfunctional device's data stores, and optionally has a display to show a QR code, visual confirmation, or other indicia that would otherwise be used directly to transfer data between two devices if they were fully operational. In this manner, the intermediary device emulates the operation of the dysfunctional device, so that as far as the target device can tell, it is communicating with a device that has the data items it needs to be transferred to it. Thus, the intermediary device operates to complete the network with the target device as well as act as a conduit to route data from the dysfunctional device to the target device. Data scans or requests for data items transmitted to the intermediary device will be forwarded to software on the dysfunctional device, and/or processed by software in the intermediary device to ultimately transmit data items on the dysfunctional device to the target device. The intermediary device, through the software installed above, is configured as discussed above to be either a client or a server and paired with additional device(s) for data transfer. However, rather than transferring data from the intermediary's devices own data stores, the intermediary device provides a virtual conduit to the data stores accessible on the dysfunctional device, generates and displays a QR code or other visual indicia for scanning or visual identification, and provides the connectivity for the dysfunctional device to transfer data to the target device. The connected dysfunctional/intermediary devices then may function together as a unit as any client/server or source/target device as specified above, and data may be transferred from (or to) the dysfunctional device via the intermediary device to the paired devices through the methods discussed above.

Devices as used in the present invention also include mobile devices such as automobiles. With advances in technology, automobiles are being equipped with sufficient computing resources to drive with partial or no involvement from a human driver, and as such, functionality of automobiles can benefit from the interchange of data between vehicles. For example, research has demonstrated traffic and safety benefits from grouping automobiles into "platoons" and automatically driving the platoon of cars as a unit, with common steering, lane control, acceleration, signaling, and braking. In this way, a closely-spaced group of cars would utilize less road space, minimize risk of front-to-back collisions, and improve fuel economy through reduction of aerodynamic drag. For the platooning configuration to work successfully, the automobiles in the platoon must be capable of interchanging command and control data, for example, braking data that informs all automobiles in the platoon to decelerate in a uniform manner to slow the platoon as a unit without collision. In an embodiment, automobiles are equipped with short-range communications devices that may form a network. To perform pairings, platoon-capable automobiles may display on the back side of the vehicle surface (or optionally also on a front-facing surface) a QR code panel that comprises a unique vehicle identifier for that particular vehicle. Such platoon-capable automobiles also are equipped with a forward-facing (and optionally rear-ward-facing) camera and scanning software to detect and recognize the unique vehicle identifier encoded in the QR code of an adjacent automobile in the platoon (in one embodiment, through a CTX/DTX approach). Optionally, such a vehicle may recognize the vehicle in the front and/or back of the vehicle. Using a wireless network protocol such as WiFi, Bluetooth, or cellular protocols, the automobiles in the platoon may be paired as mobile devices are paired in other embodiments of the invention, with a "server" vehicle identified and client vehicles identified to interchange command and control data, in addition to any other data to be conveyed between the data (such data my include navigation information, messages, or audio/visual information from one automobile to another automobile for consumption by passengers in that vehicle).

The particular implementations shown and described above are illustrative of the invention and its best mode and are not intended to otherwise limit the scope of the present invention in any way. Indeed, for the sake of brevity, conventional data storage, data transmission, and other functional aspects of the systems may not be described in detail. Methods illustrated in the various figures may include more, fewer, or other steps. Additionally, steps may be performed in any suitable order without departing from the scope of the invention. Furthermore, the connecting lines shown in the various figures are intended to represent exemplary functional relationships and/or physical couplings between the various elements. Many alternative or additional functional relationships or physical connections may be present in a practical system.

Changes and modifications may be made to the disclosed embodiments without departing from the scope of the present invention. These and other changes or modifications are intended to be included within the scope of the present invention, as expressed in the claims and drawings.

What is claimed is:

1. A method for interchanging data between a plurality of provided devices with data transfer software installed on the devices, the method comprising:

configuring the data transfer software on two devices from the plurality of devices to identify each of the two devices to be either a respective source device or a target device, wherein one or more data items from the source device are intended to be transmitted to the target device;

designating one of the source device and the target device to become a network server, wherein:
the designated device is configured to operate as a network server to the non-designated device; and
the non-designated device is configured to operate as a network client to the designated device;

generating a pairing authenticator comprising routing information;

communicating the pairing authenticator whereby the routing information allows unique association between the client device and the server device through the network;

identifying data items on the source device for transfer to the target device, whereby a group transfer list is compiled that comprises identifying information for one or more of the identified data items; and for each identified data item in the group transfer list:
a. transmit metadata about the identified data item from the source device to the target device;
b. determine, based on analysis of the metadata by the target device, whether to perform transfer of the identified data item;
c. transmit the identified data item to the target device; and
d. continue to the next identified data item in the group transfer list, if any identified data item remains un-transmitted.

2. The method of claim 1 wherein the pairing authenticator is generated by the server.

3. The method of claim 1 wherein the pairing authenticator is generated by the client.

4. The method of claim 1 wherein the pairing authenticator comprises a QR code.

5. The method of claim 4 wherein the pairing authenticator is communicated from the client device to the server device.

6. The method of claim 4 wherein the pairing authenticator is communicated by:
displaying the QR code on the display of one of the two devices; and
scanning the code with a provided camera and software included in another of the two devices.

7. The method of claim 1 further comprising:
generating a visual indicia by the server;
transmitting the visual indicia to the client; and
displaying the visual indicia on the server and the client to allow visual confirmation of a network configuration between the server and the client.

8. The method of claim 7 wherein the visual indicia comprises one of: a stored visual image, a color scheme, a word, a number, and a photograph taken by the server.

9. The method of claim 7 further comprising prompting the user, by the server, to view and confirm display of the visual indicia matches on devices that are desired to transfer data.

10. The method of claim 1 wherein device pairings are confirmed by:
generating a server authentication token comprising a time of tap by sensing data from an accelerometer in the server device indicating an impulse tap force was applied to the server device, and associating the time the tap occurred to the server device with a time of day;
generating a client authentication token comprising a time of tap by sensing data from an accelerometer in the client device indicating an impulse tap force was applied to the client device, and associating the time the tap occurred to the client device with a time of day; and
comparing the server authentication token with the client authentication token to determine whether both tokens indicate taps occurred to the client device and the server device within a predetermined timing window.

11. The method of claim 10 wherein the predetermined timing windows is 500 milliseconds.

12. The method of claim 1 wherein identifying data items on the source device for transfer to the target device further includes scanning data items on the source device, and displaying the scanned data items on the source device for selection by a user.

13. The method of claim 1 wherein identifying data items on the source device for transfer to the target device further comprises normalizing the identified data items for transfer to the target device.

14. The method of claim 1, further comprising
generating, by the source device, respective source hash values for at least one of the identified data items;
generating, by the target device, respective target hash values for data items residing on the target device;
transmitting the source hash values to the target device; and
comparing the source hash values with the target hash values.

15. The method of claim 1, further comprising creating group transfer metadata for a group of data items corresponding to the group transfer list.

16. The method of claim 15, further comprising sending, by the source device the group transfer metadata to target device.

17. The method of claim 1 wherein the plurality of provided devices further comprise one of a personal computer, a laptop, a laptop computer, a desktop computer, a mobile subscriber communication device, a mobile phone, a mobile smart phone, a mobile feature phone, a personal digital assistant (PDA), a data tablet, a digital camera, a video camera, a video game console, a media player, a Google Glass device, a global positioning system (GPS), Universal Serial Bus (USB) keys, mobile weapons, mobile storage devices, vehicles including a communication device, and combinations thereof.

18. The method of claim 1, wherein:
one of the two devices includes an intermediary device coupled to a third device;
the third device includes data items to be transferred to the target device; and
the intermediary device communicates with the target device, emulating the third device as a source device to provide data items to be transferred from the third device to the target device through the network established between the target device and the intermediary device.

19. The method of claim 18, wherein the third device comprises a dysfunctional mobile device.

20. The method of claim 1 wherein the plurality of provided devices further comprise vehicles including a communication device.

21. A method for interchanging data between a plurality of provided devices with data transfer software installed on the devices, the method comprising:

configuring the data transfer software on two devices from the plurality of devices to identify each of the two devices to be either a respective source device or a target device, wherein one or more data items from the source device are intended to be transmitted to the target device;

designating one of the source device and the target device to become a network server, wherein:
- the designated device is configured to operate as a network server to the non-designated device; and
- the non-designated device is configured to operate as a network client to the designated device;

generating a pairing authenticator comprising routing information;

communicating the pairing authenticator whereby the routing information allows unique association between the client device and the server device through the network;

generating, by the target device, respective target hash values for data items residing on the target device;

identifying data items on the source device for transfer to the target device, whereby a group transfer list is compiled that comprises identifying information for one or more of the identified data items; and for each identified data item in the group transfer list:
a. transmit metadata about the identified data item from the source device to the target device the metadata comprising a hash value generated for the data item on the source device;
b. determine, based on analysis of the metadata by the target device, whether to perform transfer of the identified data item, the analysis including comparing the hash value generated for the data item on the source device to the generated hash values for the data items residing on the target device;
c. transmit the identified data item to the target device; and
d. continue to the next identified data item in the group transfer list, if any identified data item remains un-transmitted.

* * * * *